US012803858B2

(12) United States Patent
Zhao et al.

(10) Patent No.: US 12,803,858 B2
(45) Date of Patent: Nov. 17, 2026

(54) METHOD AND DEVICE FOR SEPARATING SIGNAL OF MIXED VORTEX ELECTROMAGNETIC WAVE

(71) Applicants: SHAANXI UNIVERSITY OF TECHNOLOGY, Hanzhong (CN); XIDIAN UNIVERSITY, Xi'an (CN)

(72) Inventors: Linjun Zhao, Hanzhong (CN); Hailin Zhang, Xi'an (CN); Longwei Liu, Xi'an (CN); Danping Li, Xi'an (CN)

(73) Assignees: SHAANXI UNIVERSITY OF TECHNOLOGY, Hanzhong (CN); XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 19/223,769

(22) Filed: May 30, 2025

(65) Prior Publication Data

US 2025/0385827 A1 Dec. 18, 2025

Related U.S. Application Data

(63) Continuation-in-part of application No. PCT/CN2024/100001, filed on Jun. 19, 2024.

(30) Foreign Application Priority Data

Jun. 18, 2024 (CN) ......................... 202410781175.4

(51) Int. Cl.
*H04L 27/26* (2006.01)

(52) U.S. Cl.
CPC .............................. *H04L 27/26526* (2021.01)

(58) Field of Classification Search
CPC ...... H04B 1/16; G06F 17/14; H04L 27/26526
USPC .......................................................... 375/316
See application file for complete search history.

(56) References Cited

U.S. PATENT DOCUMENTS

2022/0094068 A1* 3/2022 Jiang .................. H01Q 15/0086
2022/0123782 A1* 4/2022 Cheng .................... H04B 1/715

* cited by examiner

*Primary Examiner* — Kevin M Burd
(74) *Attorney, Agent, or Firm* — HOWARD M COHN and Associates, LLC

(57) ABSTRACT

A signal separation method for a mixed vortex wave of nonlinear and linear vortex electromagnetic waves and an implementing device therefore are provided. The method includes separating information carried by the beam of the linear vortex electromagnetic wave from the full-aperture sampling reception vector of the mixed vortex wave beam by variable mode cyclic IFFT transformation, constructing the signal component of the linear vortex wave in the full-aperture sampling reception vector of the mixed vortex wave beam by the information carried and the Fourier sequence of the corresponding mode, subtracting the linear vortex wave signal vector from the full-aperture sampling reception vector of the mixed vortex electromagnetic wave beam to estimate the nonlinear vortex wave signal vector, and performing conjugate cyclic ZC transformation on the estimated nonlinear vortex wave signal vector to obtain the information carried by the beam of the nonlinear vortex electromagnetic wave.

2 Claims, 2 Drawing Sheets

METHOD AND DEVICE FOR SEPARATING SIGNAL OF MIXED VORTEX ELECTROMAGNETIC WAVE

CROSS REFERENCE TO RELATED APPLICATIONS

The present application is a continuation-in-part application of international application PCT/CN2024/100001 filed on Jun. 19, 2024, and entitled "METHOD AND DEVICE FOR SEPARATING SIGNAL OF MIXED VORTEX ELECTROMAGNETIC WAVE", which international application claims the priority to Chinese patent application CN 202410781175.4 filed with Chinese Patent Office on Jun. 18, 2024, contents of which are incorporated herein by reference in their entirety.

TECHNICAL FIELD

The present disclosure relates to processing of a signal of a mixed vortex electromagnetic wave in a vortex electromagnetic wave communication-perception-anti-interference integrated system, belonging to the field of communication signal processing technology and radar signal processing technology.

BACKGROUND ART

The theory and technology of improving the channel capacity of wireless communication systems are eternal research topics in the field of communications. According to Shannon's channel capacity theory, the technology of obtaining the capacity of a wireless communication system from four dimensions of the signal including frequency, time, codeword and space cannot effectively support the demand for system capacity of future wireless communications. Therefore, people try to further explore the theory and technology of improving the channel capacity of the system by using another inherent physical quantity—orbital angular momentum (OAM) carried by the electromagnetic wave to carry information. Studies have shown that the mutual orthogonality of the wavefront phases of OAM electromagnetic waves of different modes enables them to share channel at the same time to transmit. Since the wavefront phase of the OAM electromagnetic wave is distributed in a vortex shape, it is named vortex electromagnetic wave in academia.

Vortex electromagnetic waves were first discovered in experiments by Dutch physicist L. Allen in 1992. In 2007, Swedish scholar Thide Bo et al. introduced them into the microwave band and verified through experiments that the channel sharing capability of vortex electromagnetic waves may improve the channel capacity of the system without increasing the system bandwidth.

It may be known through literatures that it is feasible and convenient to transmit mode-multiplexed vortex electromagnetic waves by a uniform circular array (UCA) in the field of wireless radio frequency. The method of UCA generating vortex electromagnetic waves belongs to the phase shifting methods of array element excitation signals. Studies have shown that the sequence used for phase shifting of UCA array element excitation signals may be divided into two categories: periodic sequence and aperiodic sequence on the unit circle of the complex plane, the typical representatives of which are Discrete Fourier Sequence (DFS) and ZC sequence respectively. The wavefront phase topology structure of the vortex electromagnetic wave generated by the DFS has characteristics of $e^{j\ell\varphi}$ so the vortex electromagnetic wave generated by the DFS is called a linear vortex electromagnetic wave; and the wavefront phase topology structure of the vortex electromagnetic wave generated by the ZC sequence is no longer a simple $\ell_{\Phi}$ linear relationship, so the vortex electromagnetic wave generated by the ZC sequence is called nonlinear vortex electromagnetic wave.

Since the ZC sequence and DFS are separable, it is feasible for the UCA to perform, at the receiving end, full-aperture sampling reception on the propagated beam of the mixed vortex electromagnetic wave of the linear vortex electromagnetic wave+nonlinear vortex electromagnetic wave, and perform signal separation.

As known, the DFS has good central symmetry and axial symmetry on the unit circle of the complex plane. The beams of the linear vortex electromagnetic wave based on DFS phase shifting is hollow and divergent, and the divergences and modes $\ell$ of the beams of the linear vortex electromagnetic wave of different modes are coupled to each other; the symmetry of the ZC sequence on the complex plane is not as good as that of the DFS sequence, and the beam of the nonlinear vortex electromagnetic wave phase-shifted by the ZC sequence is not hollow; by using the periodic cyclic shifting characteristics of the ZC sequence, a cluster of beams of the mode-multiplexed nonlinear vortex electromagnetic wave may be generated, and this cluster of beams of the nonlinear vortex electromagnetic wave have a coaxial circular cyclic rotation shifting relationship in space. This provides natural conditions for the consistent convergence of beams of the nonlinear vortex electromagnetic wave.

In the vortex electromagnetic wave communication-perception-anti-interference integrated system, the different coverage areas of beams of the linear vortex electromagnetic wave are used to realize target perception, and the nonlinear vortex electromagnetic wave is used to perform information transmission under a limited receiving aperture. In summary, based on the signal processing theory and complex sequences, the inventors (group) proposed a method for separating a signal of a mixed vortex wave of a nonlinear vortex electromagnetic wave+a linear vortex electromagnetic wave, which can support the implementation of a communication-perception-anti-interference integrated wireless communication system based on the vortex electromagnetic wave.

SUMMARY

The present disclosure aims to provide a method for separating a signal of a mixed vortex wave of a nonlinear vortex electromagnetic wave+a linear vortex electromagnetic wave to support the implementation of a vortex electromagnetic wave communication-perception-anti-interference integrated system.

Further features and aspects of the present disclosure are described in the following detailed description.

DETAILED DESCRIPTION OF EMBODIMENTS

Figure 1:
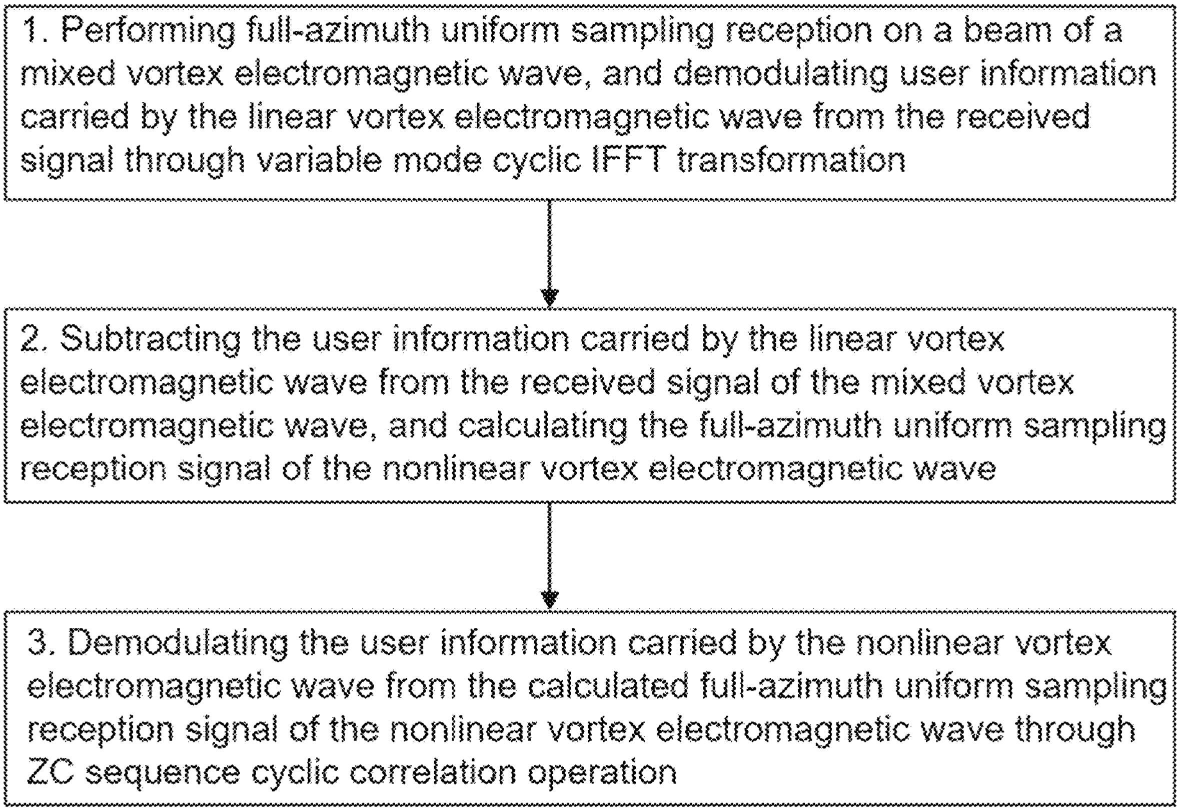
FIG. 1 is a flowchart of a method for separating a signal of a mixed vortex electromagnetic wave of the present disclosure.
Figure 2:
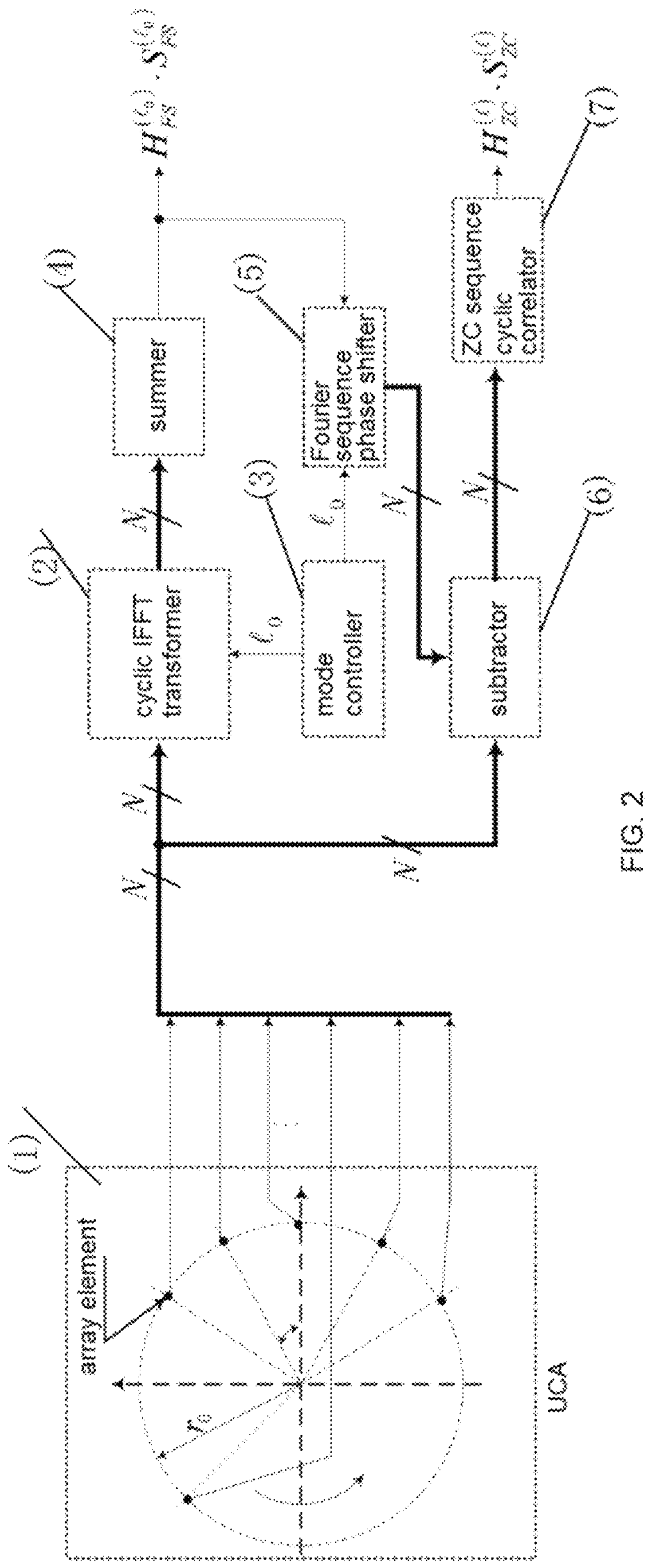
FIG. 2 is a schematic view of a physical device for the method for separating a signal of a mixed vortex electromagnetic wave according to the present disclosure, where (1) full-aperture sampling reception array of a mixed vortex electromagnetic wave, (2) cyclic IFFT transformer, (3) mode controller, (4) summer, (5) Fourier sequence phase shifter, (6) subtractor, and (7) ZC sequence cyclic correlator.

The method for separating a signal of a mixed vortex electromagnetic wave includes performing uniform full-aperture sampling on a beam of a mixed vortex electromagnetic wave by a UCA antenna having N array elements, where the responses of the N reception array elements constitute a reception response vector.

The reception response vector is subjected to cyclic IFFT operation of a mode $\ell$, and the results of N cyclic IFFT operations are summed, to obtain the user information carried by the linear vortex electromagnetic wave of the mode $\ell$, the user information carried by the linear vortex electromagnetic wave of the mode $\ell$ is subtracted from the reception response vector to obtain the reception vector of the nonlinear vortex electromagnetic wave, and the reception vector of the nonlinear vortex electromagnetic wave is subjected to conjugate cyclic ZC transformation, to obtain the user information carried by the nonlinear vortex electromagnetic wave.

The method for separating the signal of the mixed vortex electromagnetic wave includes following steps:

(a) forming a reception vector $y=y_{FS}+y_{ZC}=\{y(0), y(1), \ldots, y(i), \ldots, y(N-1)\}$ by responses of N array elements of a reception antenna, where the response y(i) of the i-th array element is, $$y(i) = y_{FS}(i) + y_{ZC}(i) = \sum_{\ell=0}^{N-1} S_{FS}^{(\ell)} \cdot H_{FS}^{(\ell)} \cdot e^{\frac{2\pi\ell}{N} \cdot i} + \sum_{\ell=0}^{N-1} S_{ZC}^{(\ell)} \cdot H_{ZC}^{(\ell)} \cdot e^{j\frac{\pi u(i-\ell)^2}{N}} \quad (1)$$

In the above, $y_{FS}(i)$ represents the signal component of the linear vortex electromagnetic wave, $y_{ZC}(i)$ represents the signal component of the nonlinear vortex electromagnetic wave, $$S_{FS}^{(\ell)}$$

represents the information carried by the linear vortex electromagnetic wave of the mode $\ell$, $$H_{FS}^{(\ell)}$$

represents the channel fading function of the linear vortex electromagnetic wave of the mode $\ell$, $$S_{ZC}^{(\ell)}$$

represents the information carried by the nonlinear vortex electromagnetic wave of the mode $\ell$, and $$H_{ZC}^{(\ell)}$$

represents the channel fading function of the nonlinear vortex electromagnetic wave of the mode $\ell$;

(b) constructing a discrete Fourier sequence set $$FS_0^{(\ell_0)} = \left\{e^{j\frac{2\pi\ell_0}{N}i}, i = 0, 1, \ldots, N-1\right\}$$

by using $\ell_0 \in \{0, 1, \ldots, N-1\}$, and performing a first IFFT operation by the $$FS_0^{(\ell_0)}$$

on the received response vector $y=y_{FS}+y_{ZC}$, $$Y_0^{(\ell_0)} = IFT(y_{FS}+y_{ZC}) = N \cdot S_{FS}^{(\ell)_0} \cdot H_{FS}^{(\ell)_0} + IFT(y_{ZC}) \quad (2)$$

(c) performing circular shifting once on the discrete Fourier sequence set $$FS_0^{(\ell_0)} = \left\{e^{j\frac{2\pi\ell_0}{N}i}, i = 0, 1, \ldots, N-1\right\}$$

to obtain a discrete Fourier sequence set $$FS_1^{(\ell_0)} = \left\{e^{j\frac{2\pi\ell_0}{N}i}, i = 1, \ldots, N-1, 0\right\},$$

and performing a second IFFT operation by the $$FS_1^{(\ell_0)}$$

on the received response vector $y=y_{FS}+y_{ZC}$, $$Y_1^{(\ell_0)} = IFT(y_{FS}+y_{ZC}) = 0 + e^{-j\frac{2\pi\ell_0}{N}\times 1} \cdot IFT(y_{ZC}) \quad (3)$$

(d) performing circular shifting once on the discrete Fourier sequence set $$FS_1^{(\ell_0)} = \left\{e^{j\frac{2\pi\ell_0}{N}i}, i = 1, \ldots, N-1, 0\right\}$$

to obtain a discrete Fourier sequence set $$FS_2^{(\ell_0)} = \left\{e^{j\frac{2\pi\ell_0}{N}i}, i = 2, \ldots, N-1, 0, 1\right\},$$

and performing a third IFFT operation by the $$FS_2^{(\ell_0)}$$

on the reception response vector $y=y_{FS}+y_{ZC}$, $$Y_2^{(\ell_0)} = IFT\,(y_{FS} + y_{ZC}) = 0 + e^{-j\frac{2\pi\ell_0}{N}\times 2} \cdot IFT\,(y_{ZC}) \tag{4}$$

(e) analogizing according to the method in step (d), to obtain discrete Fourier sequence sets $$FS_3^{(\ell_0)} = \left\{e^{j\frac{2\pi\ell_0}{N}i},\, i = 3, \ldots, N-1, 0, 1, 2\right\},$$

$$FS_4^{(\ell_0)} = \left\{e^{j\frac{2\pi\ell_0}{N}i},\, i = 4, \cdots, N-1, 0, 1, 2, 3\right\}, \ldots, \text{ and}$$

$$FS_{N-1}^{(\ell_0)} = \left\{e^{j\frac{2\pi\ell_0}{N}i},\, i = N-1, 0, 1, \ldots, N-2\right\},$$

and performing fourth, fifth, . . . , (N−1)th IFFT operations by $$FS_3^{(\ell_0)}, FS_4^{(\ell_0)}, \ldots, FS_{N-1}^{(\ell_0)}$$

respectively on the reception response vector $y=y_{FS}+y_{ZC}$ to obtain results, $$Y_3^{(\ell_0)} = IFT\,(y_{FS} + y_{ZC}) = 0 + e^{-j\frac{2\pi\ell_0}{N}\times 3} \cdot IFT\,(y_{ZC}) \tag{5}$$

$$Y_4^{(\ell_0)} = IFT\,(y_{FS} + y_{ZC}) = 0 + e^{-j\frac{2\pi\ell_0}{N}\times 4} \cdot IFT\,(y_{ZC})$$

$$\vdots$$

$$Y_{N-1}^{(\ell_0)} = IFT\,(y_{FS} + y_{ZC}) = 0 + e^{-j\frac{2\pi\ell_0}{N}\times(N-1)} \cdot IFT\,(y_{ZC})$$

(f) adding the formula (2), formula (3), formula (4) and formula (5), $$Y_0^{(\ell_0)} + Y_1^{(\ell_0)} + Y_2^{(\ell_0)} + Y_3^{(\ell_0)} + Y_4^{(\ell_0)} + \ldots + Y_{N-1}^{(\ell_0)} = N \cdot H_{FS}^{(\ell_0)} \cdot S_{FS}^{(\ell_0)} \tag{6}$$

where in the formula (6), $$H_{FS}^{(\ell_0)}$$

represents the channel attenuation constant, so $$H_{FS}^{(\ell_0)} \cdot S_{FS}^{(\ell_0)}$$

in the formula (6) represents the information carried by the beam of the linear vortex electromagnetic wave of the mode $\ell_0$, such that the $\ell_0$ traverses the mode set {0, 1, . . . , N−1} of the linear vortex electromagnetic wave once, which can separate the information $$H_{FS}^{(\ell_0)} \cdot S_{FS}^{(\ell_0)}$$

carried by the linear vortex electromagnetic wave of each mode from the sampling reception signal of the beam of the mixed vortex electromagnetic wave;

(g) constructing a signal $\hat{U}_{FS}$ by the Fourier sequence set $$FS^{(\ell_0)} = \left\{e^{j\frac{2\pi\ell}{N}i},\, i = 0, 1, \ldots, N-1\right\}$$

corresponding to the information $$H_{FS}^{(\ell_0)} \cdot S_{FS}^{(\ell_0)}$$

carried by the linear vortex electromagnetic wave and the mode $\ell$=0, 1, . . . , N−1 of the linear vortex electromagnetic wave, $$\begin{aligned} \hat{y}_{FS} &= \sum_{\ell=0}^{N-1} H_{FS}^{(\ell)} \cdot S_{FS}^{(\ell)} \square \left\{e^{j\frac{2\pi\ell}{N}i},\, i = 0, 1, \ldots, N-1\right\} \\ &= \left\{\sum_{\ell=0}^{N-1} H_{FS}^{(\ell)} \cdot S_{FS}^{(\ell)} \cdot e^{j\frac{2\pi\ell}{N}i},\, i = 0, 1, \ldots, N-1\right\} \end{aligned} \tag{7}$$

(h) subtracting the constructed signal $\hat{y}_{FS}$ from the reception vector y formed by responses of the N array elements of the reception antenna, $$\hat{y}_{ZC} = y - \hat{y}_{FS} = \left\{\sum_{\ell=0}^{N-1} S_{ZC}^{(\ell)} \cdot H_{ZC}^{(\ell)} \cdot e^{j\frac{\pi u(i-\ell)^2}{N}},\, i = 0, 1, \ldots, N-1\right\} \tag{8}$$

(i) performing conjugate cyclic ZC transformation on the $\hat{y}_{ZC}$ by a ZC sequence $$\left\{e^{j\frac{\pi u \cdot i^2}{N}},\, i = 0, 1, \ldots, N-1\right\}, \tag{9}$$

$$\sum_{\ell=0}^{N-1} S_{ZC}^{(\ell)} \cdot H_{ZC}^{(\ell)} \cdot e^{j\frac{\pi u(i-\ell)^2}{N}} \otimes e^{j\frac{\pi u i^2}{N}} = \sum_{i=0}^{N-1}\left(\left(\sum_{\ell=0}^{N-1} S_{ZC}^{(\ell)} \cdot H_{ZC}^{(\ell)} \cdot e^{j\frac{\pi u(i-\ell)^2}{N}}\right) \cdot e^{-j\frac{\pi u(i-m)^2}{N}}\right) = \begin{cases} N \cdot H_{ZC}^{(\ell)} \cdot S_{ZC}^{(\ell)}, & \ell = m \\ 0, & \ell \neq m \end{cases}$$

In the above, $$H_{ZC}^{(\ell)} \cdot S_{ZC}^{(\ell)}$$

represents the information carried by the beam of the nonlinear vortex electromagnetic wave of the model $\ell$ in the reception vector y.

What is claimed is:

1. A method for separating a signal of a mixed vortex electromagnetic wave, comprising performing uniform full-aperture sampling on a beam of the mixed vortex electromagnetic wave by a reception antenna having N array elements, forming a reception response vector by responses of N reception array elements, performing cyclic IFFT operation of a mode $\ell$ on the reception response vector, summing results of N cyclic IFFT operations to obtain information carried by a beam of a linear vortex electromagnetic wave of the mode $\ell$, then subtracting the information carried by the linear vortex electromagnetic wave of the mode $\ell$ from the reception response vector to obtain a sampling vector of a beam of a nonlinear vortex electromagnetic wave, and performing conjugate cyclic ZC transformation on a reception vector of the beam of the nonlinear vortex electromagnetic wave obtained by the subtracting to obtain information carried by the beam of the nonlinear vortex electromagnetic wave; and the method for separating the signal of the mixed vortex electromagnetic wave comprises following steps:

(a) forming a reception vector $y=y_{FS}+y_{ZC}=\{y(0), y(1), \ldots, y(i), \ldots, y(N-1)\}$ by the responses of the N array elements of the reception antenna, wherein a response of an i-th array element y(i) is, $$y(i) = y_{FS}(i) + y_{ZC}(i) = \sum_{\ell=0}^{N-1} S_{FS}^{(\ell)} \cdot H_{FS}^{(\ell)} \cdot e^{j\frac{2\pi\ell}{N} \cdot i} + \sum_{\ell=0}^{N-1} S_{ZC}^{(\ell)} \cdot H_{ZC}^{(\ell)} \cdot e^{j\frac{\pi u(i-\ell)^2}{N}} \tag{1}$$

wherein $y_{FS}(i)$ represents a signal component of the linear vortex electromagnetic wave, $y_{ZC}(i)$ represents a signal component of the nonlinear vortex electromagnetic wave, $$S_{FS}^{(\ell)}$$

represents information carried by the linear vortex electromagnetic wave of the mode $\ell$, $$H_{FS}^{(\ell)}$$

represents a channel fading function of the linear vortex electromagnetic wave of the mode $\ell$, $$S_{ZC}^{(\ell)}$$

represents information carried by the nonlinear vortex electromagnetic wave of the mode $\ell$, and $$H_{ZC}^{(\ell)}$$

represents a channel fading function of the nonlinear vortex electromagnetic wave of the mode $\ell$;

(b) constructing a discrete Fourier sequence set $$FS_0^{(\ell_0)} = \left\{e^{j\frac{2\pi\ell_0}{N}i}, i = 0, 1, \ldots, N-1\right\}$$

by using $\ell_0=\{0, 1, \ldots, N-1\}$, and performing a first IFFT operation by the $$FS_0^{(\ell_0)}$$

on the reception response vector $y=y_{FS}+y_{ZC}$, $$Y_0^{(\ell_0)} = IFT(y_{FS} + y_{ZC}) = N \cdot S_0^{(\ell_0)} \cdot H_0^{(\ell_0)} + IFT(y_{ZC}) \tag{2}$$

(c) performing circular shifting on the discrete Fourier sequence set $$FS_0^{(\ell_0)} = \left\{e^{j\frac{2\pi\ell_0}{N}i}, i = 0, 1, \ldots, N-1\right\}$$

once to obtain a discrete Fourier sequence set $$FS_1^{(\ell_0)} = \left\{e^{j\frac{2\pi\ell_0}{N}i}, i = 1, \ldots, N-1, 0\right\},$$

and performing a second IFFT operation by the $$FS_1^{(\ell_0)}$$

on the reception response vector $y=y_{FS}+y_{ZC}$, $$Y_1^{(\ell_0)} = IFT(y_{FS} + y_{ZC}) = 0 + e^{-j\frac{2\pi\ell_0}{N}\times 1} \cdot IFT(y_{ZC}) \tag{3}$$

(d) performing circular shifting on the discrete Fourier sequence set once to obtain a discrete Fourier sequence set $$FS_1^{(\ell_0)} = \left\{e^{j\frac{2\pi\ell_0}{N}i}, i = 1, \ldots, N-1, 0\right\}$$

once to obtain a discrete Fourier sequence set $$FS_2^{(\ell_0)} = \left\{e^{j\frac{2\pi\ell_0}{N}i}, i = 2, \ldots, N-1, 0, 1\right\},$$

and performing a third IFFT operation by the $$FS_2^{(\ell_0)}$$

on the reception response vector $y=y_{FS}+y_{ZC}$, $$Y_2^{(\ell_0)} = IFT(y_{FS} + y_{ZC}) = 0 + e^{-j\frac{2\pi\ell_0}{N}\times 2} \cdot IFT(y_{ZC}) \tag{4}$$

(e) analogizing according to a method in the step (d), to obtain discrete Fourier sequence sets $$FS_3^{(\ell_0)} = \left\{e^{j\frac{2\pi\ell_0}{N}i}, i = 3, \ldots, N-1, 0, 1, 2\right\},$$
$$FS_4^{(\ell_0)} = \left\{e^{j\frac{2\pi\ell_0}{N}i}, i = 4, \ldots, N-1, 0, 1, 2, 3\right\}, \ldots,$$
$$\text{and } FS_{N-1}^{(\ell_0)} = \left\{e^{j\frac{2\pi\ell_0}{N}i}, i = N-1, 0, 1, \ldots, N-2\right\},$$

and performing fourth, fifth, . . . , (N−1)th IFFT operations by $$FS_3^{(\ell_0)}, FS_4^{(\ell_0)}, \ldots, FS_{N-1}^{(\ell_0)}$$

respectively on the reception response vector $y=y_{FS}+y_{ZC}$, to obtain results:

$$Y_3^{(\ell_0)} = IFT(y_{FS}+y_{ZC}) = 0 + e^{-j\frac{2\pi\ell_0}{N}\times 3}\cdot IFT(y_{ZC}) \quad (5)$$
$$Y_4^{(\ell_0)} = IFT(y_{FS}+y_{ZC}) = 0 + e^{-j\frac{2\pi\ell_0}{N}\times 4}\cdot IFT(y_{ZC})$$
$$\vdots$$
$$Y_{N-1}^{(\ell_0)} = IFT(y_{FS}+y_{ZC}) = 0 + e^{-j\frac{2\pi\ell_0}{N}\times(N-1)}\cdot IFT(y_{ZC})$$

(f) adding the formula (2), the formula (3), the formula (4) and the formula (5), $$Y_0^{(\ell_0)} + Y_1^{(\ell_0)} + Y_2^{(\ell_0)} + Y_3^{(\ell_0)} + Y_4^{(\ell_0)} + \ldots + Y_{N-1}^{(\ell_0)} = N\cdot H_{FS}^{(\ell_0)}\cdot S_{FS}^{(\ell_0)} \quad (6)$$

wherein in the formula (6), $$H_{FS}^{(\ell_0)}$$

represent a channel attenuation constant, so $$H_{FS}^{(\ell_0)}\cdot S_{FS}^{(\ell_0)}$$

in the formula (6) represents information carried by a beam of the linear vortex electromagnetic wave of a mode $\ell_0$, such that the $\ell_0$ traverses a mode set {0, 1, . . . , N−1} of the linear vortex electromagnetic wave once, to separate the information $$H_{FS}^{(\ell)}\cdot S_{FS}^{(\ell)}$$

carried by the linear vortex electromagnetic wave of each mode from a sampling reception signal of the beam of the mixed vortex electromagnetic wave;

(g) constructing a signal $\hat{y}_{FS}$ by the Fourier sequence set $$FS^{(\ell)} = \left\{e^{j\frac{2\pi\ell}{N}i}, i = 0, 1, \ldots, N-1\right\}$$

corresponding to the information $$H_{FS}^{(\ell)}\cdot S_{FS}^{(\ell)}$$

carried by the linear vortex electromagnetic wave and the mode $\ell$=0, 1, . . . , N−1 of the linear vortex electromagnetic wave, $$\hat{y}_{FS} = \sum_{\ell=0}^{N-1} H_{FS}^{(\ell)}\cdot S_{FS}^{(\ell)} \odot \left\{e^{j\frac{2\pi\ell}{N}i}, i = 0, 1, \ldots, N-1\right\} \quad (7)$$

-continued $$= \left\{\sum_{\ell=0}^{N-1} H_{FS}^{(\ell)}\cdot S_{FS}^{(\ell)}\cdot e^{j\frac{2\pi\ell}{N}i}, i = 0, 1, \ldots, N-1\right\}$$

(h) subtracting the constructed signal $\hat{y}_{FS}$ from the reception vector y formed by the responses of the N array elements of the reception antenna, $$\hat{y}_{ZC} = y - \hat{y}_{FS} \quad (8)$$
$$= \left\{\sum_{\ell=0}^{N-1} S_{ZC}^{(\ell)}\cdot H_{ZC}^{(\ell)}\cdot e^{j\frac{\pi u(i-\ell)^2}{N}}, i = 0, 1, \ldots, N-1\right\}$$

and (i) performing conjugate cyclic ZC transformation on the $\hat{y}_{ZC}$ by a ZC sequence $$\left\{e^{j\frac{\pi u\cdot i^2}{N}}, i = 0, 1, \ldots, N-1\right\}, \quad (9)$$

$$\sum_{\ell=0}^{N-1} S_{ZC}^{(\ell)}\cdot H_{ZC}^{(\ell)}\cdot e^{j\frac{\pi u(i-\ell)^2}{N}} \otimes e^{j\frac{\pi u i^2}{N}} =$$
$$\sum_{i=0}^{N-1}\left(\left(\sum_{\ell=0}^{N-1} S_{ZC}^{(\ell)}\cdot H_{ZC}^{(\ell)}\cdot e^{j\frac{\pi u(i-\ell)^2}{N}}\right)\cdot e^{-j\frac{\pi u(i-m)^2}{N}}\right) = \begin{cases} N\cdot H_{ZC}^{(\ell)}\cdot S_{ZC}^{(\ell)}, & \ell = m \\ 0, & \ell \neq m \end{cases}$$

wherein $$H_{ZC}^{(\ell)}\cdot S_{ZC}^{(\ell)}$$

represents the information carried by the beam of the nonlinear vortex electromagnetic wave of the mode $\ell$ in the reception vector y.

2. A physical device for implementing the method for separating a signal of a mixed vortex electromagnetic wave according to claim 1, wherein a full-aperture sampling reception vector of the beam of the mixed vortex electromagnetic wave is subjected to variable mode cyclic IFFT transformation, outputs of the variable mode cyclic IFFT transformation are grouped and summed to obtain information carried by the linear vortex electromagnetic wave of different modes, a linear vortex wave signal component in the full-aperture sampling reception vector of the beam of the mixed vortex electromagnetic wave is estimated by the information carried by the linear vortex electromagnetic wave of each of the different modes and a Fourier sequence of the corresponding mode, and the linear vortex wave signal component is subtracted from the full-aperture sampling reception vector of the beam of the mixed vortex electromagnetic wave to obtain a sampling reception vector of the beam of the nonlinear vortex electromagnetic wave, and the sampling reception vector of the beam of the nonlinear vortex electromagnetic wave obtained by calculation is subjected to conjugate cyclic ZC transformation by the ZC sequence, to obtain information carried by the beam of the nonlinear vortex electromagnetic wave in the full-aperture sampling reception vector of the beam of the mixed vortex electromagnetic wave, wherein the physical device comprises a full-aperture sampling reception array of the mixed vortex electromagnetic wave, a cyclic IFFT transformer, a mode controller, a summer, a Fourier sequence phase shifter, a subtractor and a ZC sequence cyclic correlator, wherein an output end of the full-aperture sampling reception array of the mixed vortex electromagnetic wave is connected to an input end of the cyclic IFFT transformer and an input end of the subtractor, an output end of the cyclic IFFT transformer is connected to an input end of the summer, an output end of the summer is connected to an input end of the Fourier sequence phase shifter, an output end of the Fourier sequence phase shifter is connected to the input end of the subtractor, an output end of the subtractor is connected to an input end of the ZC sequence cyclic correlator, and the mode controller is configured to control a mode of the cyclic IFFT transformer to synchronize and change with a mode of the Fourier sequence phase shifter.

* * * * *